J. S & D. Lake.
Mower.
№ 10
№ 1115
Reissued Jan. 1, 1861
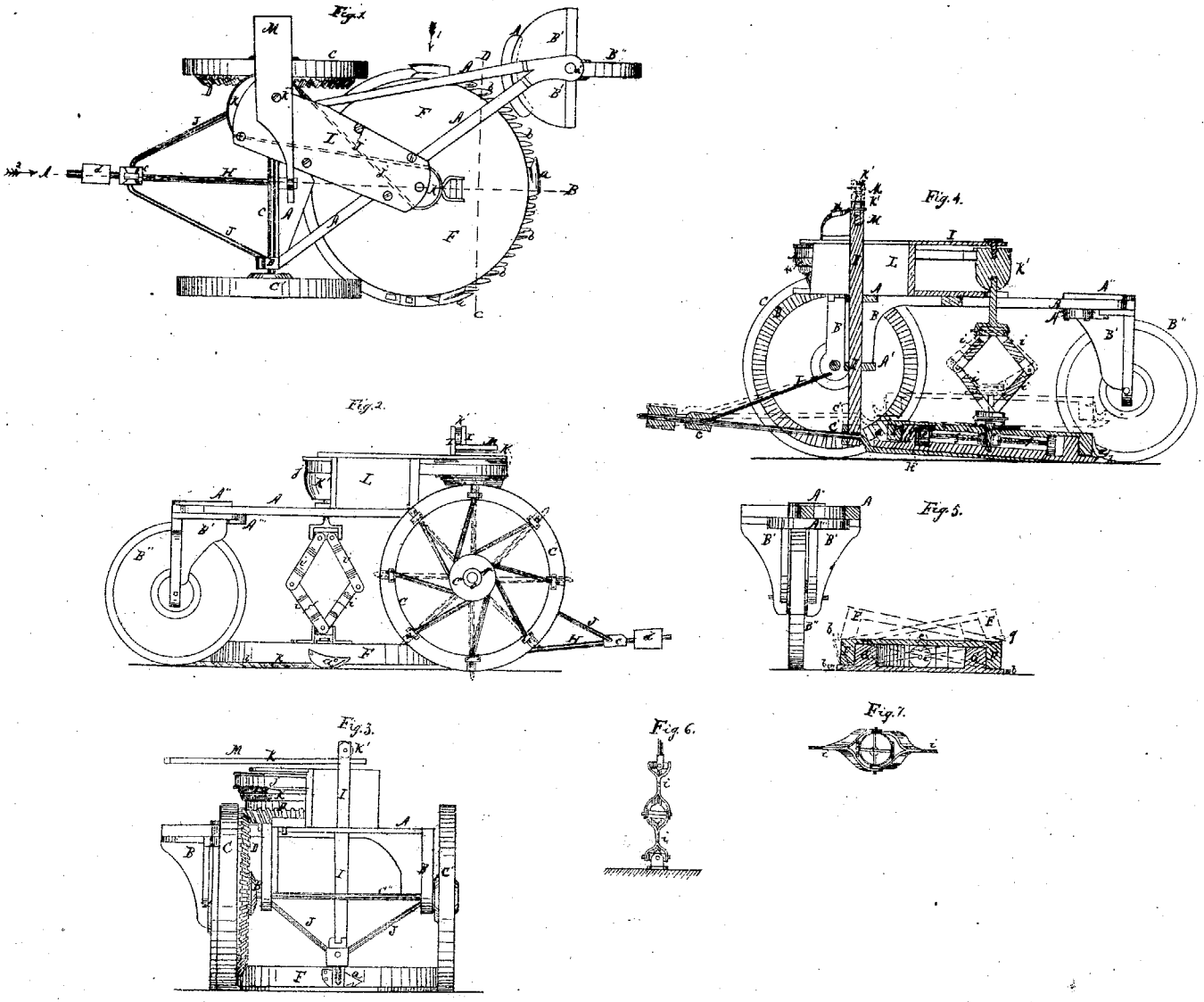
Witnesses
H. Clarke Hooker
A. Richards
Inventor
Jesse S. Lake
David Lake
By their Attorney
Geo. H. Boyce

UNITED STATES PATENT OFFICE.

JESSE S. LAKE AND DAVID LAKE, OF SMITH'S LANDING, NEW JERSEY, ASSIGNORS TO JAMES A. SAXTON.

IMPROVEMENT IN GRASS-HARVESTERS.

Specification forming part of Letters Patent No. 9,137, dated July 20, 1852; Reissue No. 1,115, dated January 1, 1861.

*To all whom it may concern:*

Be it known that we, JESSE S. LAKE and DAVID LAKE, both of Smith's Landing, in the county of Atlantic and State of New Jersey, have invented certain new and useful Improvements in Mowing-Machines or Grass-Harvesters; and we do hereby declare that the following is a full, clear, and exact description of the same, reference being had to the accompanying drawings, forming a part of this specification, and in which—

Figure 1 represents a plan view of a machine, showing one mode of applying our said improvements. Fig. 2 represents a side view of the machine as shown in Fig. 1, looking in the direction of arrow 1, the machine being represented as reversed, or facing in an opposite direction from Fig. 1. Fig. 3 represents a portion of the frame, wheels, and cutting apparatus, looking in the direction of arrow 2, Fig. 1. Fig. 4 represents a longitudinal section on line A B, Fig. 1, the cutting apparatus being shown in two different positions, one in black lines and the other in red. Fig. 5 represents a cross-section on line C D, Fig. 1, looking in the direction of arrow 2, the parts G and F being shown in different positions in full and dotted red lines. Figs. 6 and 7 represent detached parts of the mechanism used to operate the cutting apparatus.

Whenever it may be expedient to use one or more of the several parts or branches of our improvements separate from the rest, such part or parts may be used in connection with any suitable frame and gearing, and it is obvious that several parts of our improvements are applicable to various other mowing-machines in use.

Mowing-machines as heretofore constructed have not had combined therewith a lever-seat for the driver—that is, a seat having a fulcrum—and also so combined, hinged, or pivoted to that part of the machine to which the cutting apparatus was attached or sustained as that the weight of the driver acted as a counterpoise or balance to the cutting apparatus, and whereby the driver could, by simply moving back on his seat, cause the opposite end of his seat to be elevated, together with the cutting apparatus, so that the driver could, by simply moving back and forth on his seat, cause the finger-support platform, or that part of the machine to which the guards or fingers were attached, to be elevated, so as to press very lightly on the stubble or ground, or to be raised entirely above the stubble or ground, in passing from one field to another.

That branch of our improvements which is the subject of this patent is designed to accomplish the above ends; and it consists in the combination, with the frame and cutting apparatus of a mowing-machine, of a lever-seat for the driver.

It is not deemed necessary to describe in detail the various parts of the mowing-machine represented in the drawings, since the various parts of said machine are fully described in other reissued patents of even date herewith, and of which this is one division.

In the drawings, A A A represent a triangular main frame, which is supported in front by a swivel-wheel, B″, connected to its frame B′, as shown in the drawings. The frame B′ is pivoted to the front of frame A at *a*′, so that it can turn either to the right or left, its rear circular part turning above a lip or projection of piece A‴, as shown in dotted lines, Fig. 1. The rear of the frame A is supported by two wheels, C C′, whose journal or axis C″ turns in the downwardly-projecting parts B B of the frame A. Motion is communicated from gear D on wheel C to gear E and pulley K; thence by band *j* to pulley K′, to the bottom of whose shaft are connected a double set of levers, *i i* and *i*′ *i*′, which in turn are connected to the top of a circular frame, F, to the edge of which are fastened cutters *a*, so that as the machine is advanced by the team, which is to be attached to the frame B′, the cutter-frame F, with its cutters *a*, is caused to rotate over the frame or support G, to which the fingers *b* are attached, and thus the grass is cut by the cutters *a* while it is sustained by the fingers *b*. (See the drawings, which show the mode of connection of the various parts.) The platform or finger-support G, which supports the cutting apparatus, is grooved out on its upper side, and is provided with a friction device upon which the frame F rests as it rotates. The under side of G is recessed or cut out, so that the lever or metallic connection H can be fastened to it in a manner that leaves the bottom sides flush where they come in contact with the ground. The metallic connection or lever H is curved up in rear of the platform G, and then passes loosely through a sliding or coupling piece, I, and a guide-piece, *c*, and is provided with an adjustable weight, *d*, on its rear end. Brace-levers J J are hinged to the parts B B and to guide-piece *c*, so that the metallic connection H is held in proper position laterally. The sliding or coupling piece I passes up through cross-piece A′ and the rear piece, A, of the main frame, and through which it is free to slide. It is also provided at the top with a friction-roll, K′, under which passes one end of a lever-seat, M, which has its fulcrum on the gear-frame L at K. The lever-seat M extends over the wheel C, as shown in the drawings. It will now be seen that the finger-support and cutting apparatus can be balanced in the piece I by the weight *d*, or the weight *d* might be so arranged as to cause the front of the finger-support and cutting apparatus to tip up or down before the driver takes his seat M, (which is also a lever,) pivoted at *k*.

With a driver's seat thus combined with the cutting apparatus of a mowing-machine it answers as a lever, whereby the weight of the driver is made to act as a counterpoise or balance to the finger-support and cutting apparatus, since, if the driver wishes to depress the cutting apparatus, he moves on his seat toward the sliding piece I, and when he wishes to elevate the cutting apparatus he moves in an opposite direction. Again, the arrangement and combination are such that the weight of the driver may not only be used to raise and balance the finger-support and cutting apparatus, but also and at the same time as the means of transferring not only his own weight, but that of the finger-support and cutting apparatus, upon the main driving-wheel, which is located under his seat, as shown in the drawings. It will be seen that the driver's seat extends out and back over the main drive-wheel, which has no outside support, so that as the weight of the driver is made to press or bear on that part of the seat which is outside of the wheel the whole weight of the driver, together with the cutting apparatus, may be transferred upon the main drive-wheel as a fulcrum.

The great advantage of this branch of our invention will be apparent to those skilled in the art. It enables the driver to control the cutting apparatus almost at pleasure, and to transfer the weight upon a single driving-wheel, the wheel C′ being loose on shaft C″. As the machine advances the cutting apparatus is free to conform to the equalities of the ground independently of the up-and-down motions of the main frame and main gear-wheel, and yet by our invention the driver is enabled to cause the weight thereof to be borne mostly by a single driving-wheel placed outside of the main frame, and that, too, without the necessity of using his hands to operate levers and wheels. When the machine is be drawn over cut grass or from one field to another, the driver, by simply moving on his seat, can elevate the cutting apparatus to avoid obstructions or cut grass.

Having described one practical way in which that branch of our invention which forms the subject of this patent can be carried out, we do not confine ourselves to any particular mode of applying our said invention to the various mowing-machines in use; but What we do claim as our invention, and desire to secure by Letters Patent, is—

1. The combination of a hinged lever-seat for the driver with the main frame and cutting apparatus of a mowing-machine.

2. The combination of a main frame and an inclined projecting hinged lever-seat with a main drive-wheel having no outside support.

In witness whereof we have hereunto subscribed our names.

JESSE S. LAKE.
DAVID LAKE.

In presence of—
JOHN T. LAKE,
HENRY W. ROBINSON.